(12) United States Patent
Hsiao

(10) Patent No.: US 10,715,770 B2
(45) Date of Patent: Jul. 14, 2020

(54) PROJECTION DEVICE, PROJECTION SYSTEM AND AN IMAGE CALIBRATION METHOD

(71) Applicant: Coretronic Corporation, Hsin-Chu (TW)

(72) Inventor: Pei-Chi Hsiao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/524,204

(22) Filed: Jul. 29, 2019

(65) Prior Publication Data

US 2020/0045277 A1 Feb. 6, 2020

(30) Foreign Application Priority Data

Jul. 31, 2018 (CN) .......................... 2018 1 0856421

(51) Int. Cl.
*H04N 9/31* (2006.01)
*G06T 3/00* (2006.01)

(52) U.S. Cl.
CPC ......... *H04N 9/3185* (2013.01); *G06T 3/0093* (2013.01); *H04N 9/3194* (2013.01)

(58) Field of Classification Search
CPC ... H04N 9/3185; H04N 9/3194; G06T 3/0093
USPC ........................................................ 348/189
See application file for complete search history.

(56) References Cited

U.S. PATENT DOCUMENTS

| | | |
|---|---|---|
| 7,001,023 B2 | 2/2006 | Lee et al. |
| 7,036,940 B2 | 5/2006 | Matsuda et al. |
| 2008/0136976 A1 | 6/2008 | Ajito et al. |
| 2012/0212627 A1* | 8/2012 | Klose ................... H04N 9/3194 348/189 |
| 2015/0254819 A1 | 9/2015 | Hara |
| 2016/0134851 A1 | 5/2016 | Grundhofer |

(Continued)

FOREIGN PATENT DOCUMENTS

| | | |
|---|---|---|
| CN | 103019643 | 4/2013 |
| JP | 2012134731 A * | 7/2012 |

(Continued)

OTHER PUBLICATIONS

Ramesh Raskar, et al., "Multi-projector displays using camera-based registration," Proceedings Visualization'99: celebrating ten years, IEEE Computer Society Press, Oct. 24-29, 1999, pp. 1-8.

(Continued)

*Primary Examiner* — Michael Lee
(74) *Attorney, Agent, or Firm* — JCIPRNET

(57) ABSTRACT

A projection device including a processor circuit is provided. A reverse-warped image is generated by the processor circuit according to an input image and a second mapping table. The projection device is adapted to project the reverse-warped image onto the projection screen. The second mapping table is converted from a first mapping table according to a plurality of warped feature points caused according to a first calibration pattern and a second calibration pattern. A projection system and an image calibration method are also provided. Therefore, an undistorted and a non-warped image may be formed on a curved projection screen and be viewed by a viewer.

9 Claims, 7 Drawing Sheets

(56) References Cited

U.S. PATENT DOCUMENTS

2018/0061021 A1    3/2018  Lin
2019/0005607 A1*  1/2019  Tamai ................. G06T 5/20
2019/0073753 A1*  3/2019  Yamauchi ........... G06T 3/005

FOREIGN PATENT DOCUMENTS

TW      I357985      2/2012
TW      I592020      7/2017

OTHER PUBLICATIONS

Jin Zhou, et al., "Multi-projector display with continuous self-calibration," Proceedings of the 5th ACM/IEEE International Workshop on Projector camera systems, ACM, Aug. 2008, pp. 1-7.

Fred L. Bookstein, "Principal warps: Thin-plate splines and the decomposition of deformations," IEEE Transactions on pattern analysis and machine intelligence, vol. 11 No. 6, Jun. 1989, pp. 567-585.

Thaddeus Beier, et al., "Feature-based image metamorphosis," Computer Graphics, vol. 26 No. 2, Jul. 1992, pp. 35-42.

Scott Schaefer, et al., "Image deformation using moving least squares," ACM transactions on graphics (TOG), vol. 25. No. 3, Jul. 2006, pp. 1-8.

Ruigang Yang, et al., "Automatic and Continuous Projector Display Surface Calibration Using Every-day Imagery," Proceedings of the 9th International Conference in Central Europe on Computer Graphics, Visualization and Computer Vision, Feb. 5-9, 2001, pp. 1-8.

Tyler Johnson, et al., "Real-Time Projector Tracking on Complex Geometry Using Ordinary Imagery," 2007 IEEE Conference on Computer Vision and Pattern Recognition, Jun. 17-22, 2007, pp. 1-3.

"Search Report of Europe Counterpart Application", dated Jan. 3, 2020, p. 1-p. 12.

\* cited by examiner

PROJECTION DEVICE, PROJECTION SYSTEM AND AN IMAGE CALIBRATION METHOD

CROSS-REFERENCE TO RELATED APPLICATION

This application claims the priority benefit of China application serial no. 201810856421.2, filed on Jul. 31, 2018. The entirety of the above-mentioned patent application is hereby incorporated by reference herein and made a part of this specification.

BACKGROUND

Field of the Invention

The invention relates to a projection device, a projection system and an image calibration method thereof, and particularly relates to a projection device applied to a curved projection screen, a projection system and an image calibration method.

Description of Related Art

Projectors are commonly used in home entertainment and seminar presentation. In recent years, projectors are further used in virtual reality and light carving projection. It is becoming a new way of media art presentation that an irregularly-shaped surface may be used as a screen of projection. Basically, the projector has to be placed in a manner that a center of an optical axis of the projector is perpendicular to a projection surface, such that the projected images may not be warped. However, in this condition, the placement of the projectors is limited, and the viewing angle may also be limited. To accommodate the placement of a projector, a reflector or an image processing chip may be included in a projector, so as to achieve an image pre-deformation mechanism. Such pre-deformation mechanism may generally be limited for a trapezoidal calibration where the projection surface is assumed to be planar. When the projected surface is an arbitrarily-shaped curved surface, for example, an uneven wall surface with slight sags and crests, or a curved screen, it is necessary to pre-deform the image according to the different geometry of the surface, so as to avoid the image from warp or distortion.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projection device, a projection system and an image calibration method, and a viewer may view an undistorted and a non-warped image from a curved projection screen.

Other features and advantages of the embodiments of the invention are illustrated by the technical features broadly embodied and described as follows.

In order to achieve one or a part or all the objectives or other objectives, an embodiment of the invention provides a projection device including a processor circuit. A reverse-warped image is generated by the processor circuit according to an input image and a second mapping table. The projection device projects the reverse-warped image onto the projection screen. The second mapping table is converted from a first mapping table according to a plurality of warped feature points caused according to a first calibration pattern and a second calibration pattern.

In order to achieve one or a part or all the objectives or other objectives, another embodiment of the invention provides an image calibration method. The image calibration method is adapted to be performed by a projection device, so as to project a reverse-warped image to a projection screen. The image calibration method includes generating the plurality of warped feature points according to the first calibration pattern and the second calibration pattern. The image calibration method includes converting the first mapping table to the second mapping table according to the plurality of warped feature points, where the first calibration pattern is projected onto the projection screen, and the second calibration pattern is acquired by capturing an image of the first calibration pattern projected onto the projection screen. The image calibration method includes generating the reverse-warped image according to the input image and the second mapping table, and projecting the reverse-warped image onto the projection screen.

In order to achieve one or a part or all the objectives or other objectives, another embodiment of the invention provides a projection system, adapted to project an image to a projection screen. The projection system includes a projection device, an image capturing device, and a processor circuit. The projection device projects the first calibration pattern onto the projection screen. The image capturing device captures an image of the first calibration pattern projected onto the projection screen, so as to acquire the second calibration pattern. The processor circuit is connected with the projection device and the image capturing device. A plurality of warped feature points is generated by the processor circuit according to the first calibration pattern and the second calibration pattern, and the second mapping table is converted from the first mapping table by the processor circuit according to the plurality of warped feature points. The reverse-warped image is generated by the projection device according to the input image and the second mapping table. The projection device projects the reverse-warped image onto the projection screen.

Based on the above, the embodiments of the invention achieve at least one of the following advantages or effects. The projection device projects the reverse-warped image to the projection screen, such that the viewer may view a non-warped and undistorted image from the projection screen.

Other objectives, features and advantages of the present invention will be further understood from the further technological features disclosed by the embodiments of the present invention where there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
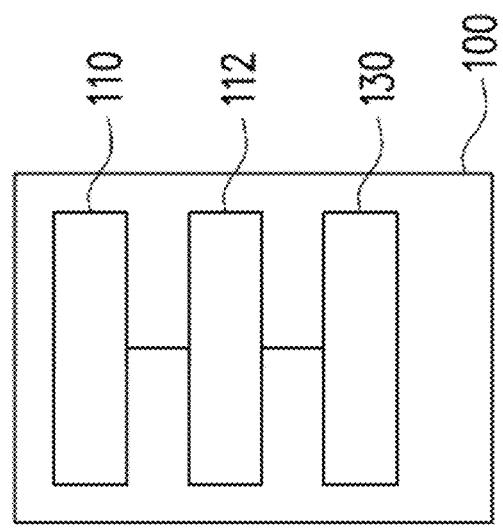
FIG. 1A illustrates a schematic diagram of a projection system according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. The terms used herein such as "above," "below," "front," "back," "left," and "right" are for the purpose of describing directions in the figures only. Accordingly, the drawings and descriptions will be regarded as illustrative in nature and not as restrictive.

Image calibrations performed by a projection device in response to different projection surfaces are collectively referred to as a geometry calibration. When a relative position between a projection screen and the projector is changed, or when a geometric shape of the projection screen is changed, recalibration is required to be performed by a projector so as to project a pre-warped image, such that the image presented on the projection screen is non-warped and undistorted. When the screen is a plane, an image presented on the screen has a trapezoidal contour or a quadrilateral contour with a perspective transformation. A pre-warped image may be generated by calculating a holography transformation relationship according to four corresponding control points. When the geometric shape of the screen may be described by certain mathematical equations, for example, a spherical surface, a biconcave surface, a cylinder surface, a plane, etc., spatial coordinates of the geometric surface may be fully grasped as long as the mathematical equations describing the geometric shape of the projection screen are found. By simulating a surface of a screen where the light emitted from each pixel of the projector is projected via a three-dimensional simulation method, a pre-warped image may be calculated. When the screen is an arbitrarily-shaped curved surface, for example, an uneven wall surface with slight sags and crests, a wall corner, a curtain, or any one of the aforementioned geometric surfaces, it is necessary to accurately grasp the geometric surface of the screen, so as to generate a pre-warped image. With existing techniques, a camera calibration in advance or special optical sensing components are needed to perform the geometry calibration for an arbitrarily-shaped curved surface, which increases the complexity of a geometry calibration process and more time is required to install and setup the system.

In an exemplary embodiment of the invention, the geometry calibration process of a projection device is relatively simple, and time required for system setup and installation is decreased. The projection device projects a reverse-warped image to a curved projection screen, such that a non-warped and undistorted image may be reviewed by a viewer from a curved projection screen. At least one example is described and illustrated in detail together with some reference drawings below.

FIG. 1A illustrates a schematic diagram of a projection system according to an embodiment of the invention. A projection system 100 of an embodiment includes a projection device 110 (for example, a projector), the processor circuit 112, and the image capturing device 130. The projection device 110 is connected with the processor circuit 112. The processor circuit 112 is connected with the image capturing device 130. The image capturing device 130 is connected with the projection device 110. It should be noted that connection relationship between each of the two devices may be a signal transmission, where signals may be transmitted by a wire or wireless manner among these devices. The processor circuit 112 is physically disposed in the projection device 110, or the processor circuit 112 is physically disposed in the image capturing device 130. In other embodiments, the projection system 100 further includes a host system, and the processor circuit 112 may also be disposed in the host system. However, the position of the processor circuit 112 is not limited in the invention. The processor circuit 112 may also be a single device. The projection device 110 and the image capturing device 130 may, for example, be implemented to be integrated and packaged into one projection device. Alternatively, the projection device 110 and the image capturing device 130 may also be implemented respectively as independent apparatus. However, the invention is not limited thereto.

Figure 1B:
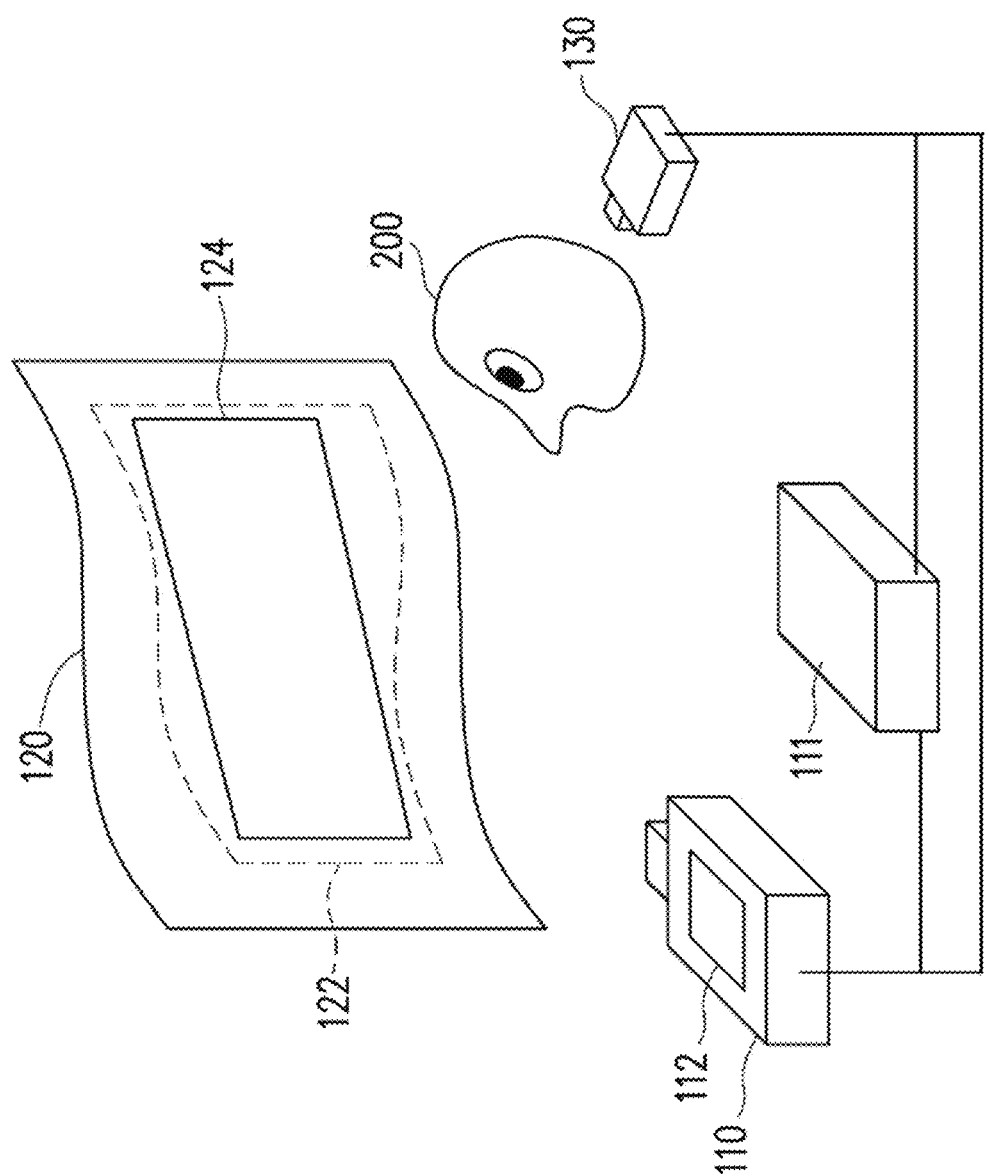
FIG. 1B illustrates a brief schematic diagram of a projection system according to an embodiment of the invention.

FIG. 1B illustrates a brief schematic diagram of a projection system according to an embodiment of the invention.

The projection system 100 of this embodiment includes the projection device 110, a host system 111, a curved projection screen 120, and the image capturing device 130. The projection device 110 includes the processor circuit 112 used to perfume an image calibration, so as to generate a reverse-warped mapping table W (a second mapping table). Furthermore, the projection device 110 may also include an optical element, a circuit element, a mechanical element, or other elements for the function of image projection. The projection device 110 may receive an input image (for example, an input image 410 drawn in FIG. 4A) from the host system 111. In addition, the received input image is converted to the reverse-warped image (for example, a reverse-warped image 420 drawn in FIG. 4B) by the processor circuit 112 according to the reverse-warped mapping table W. Then, the projection device 110 further projects the reverse-warped image onto the curved projection screen 120. Therefore, a viewer 200 may view a non-warped and undistorted projection image on the curved projection screen 120 at his position.

In this embodiment, a reference numeral 122 represents a projection range of the projection device 110 on the curved projection screen 120. A reference numeral 124 represents a projection range of the projection device 110 on the curved projection screen 120 after image calibration. On the curved projection screen 120, the projection range 124 after image calibration is smaller than the projection range 122 before image calibration. The curved projection screen 120 includes, for example, surfaces such as a plane, a partial plane and a partial curved surface, a curved surface, a concave surface, a spherical surface, an arbitrarily-shaped curved surface, etc. The arbitrarily-shaped curved surface may comprise a geometric surface with an arbitrarily-curved surface which may partially change continuously and satisfies Euclidean space characteristics. The geometric surface of the arbitrarily-shaped curved surface may also be referred as manifolds, which has a soft overall topological structure, and a topological structure mapped from a plane to the arbitrarily-shaped curved surface remains unchanged. In this embodiment, the received input image is deformed by the projection device 110 according to this characteristic, such that a deformed image (that is, the reverse-warped image) may be projected onto the curved projection screen 120 and a non-warped and undistorted projection calibration result is viewed from the viewer 200's angle.

Figure 1C:
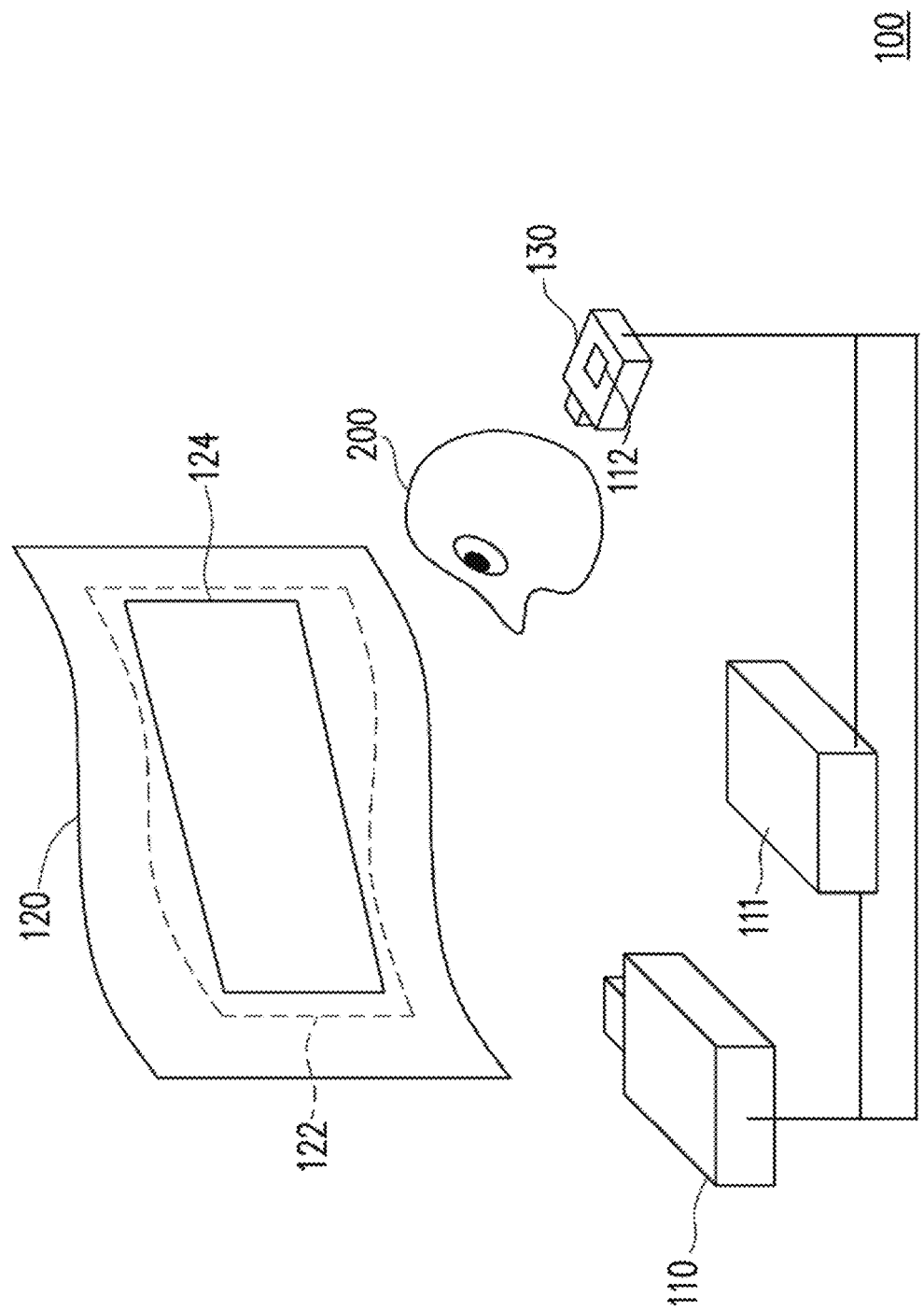
FIG. 1C illustrates a brief schematic diagram of a projection system according to another embodiment of the invention.

FIG. 1C illustrates a brief schematic diagram of a projection system according to another embodiment of the invention. The difference between the projection system 100 of this embodiment and the projection system of FIG. 1B is that the processor circuit 112 of this embodiment is disposed in the image capturing device 130, adapted to execute an image calibration, so as to generate the reverse-warped mapping table W (i.e. the second mapping table). The reverse-warped mapping table W may be transmitted to the projection device 110, and the projection device 110 includes a storage device (e.g. memory), such that the reverse-warped mapping table W may be stored in the storage device. In addition, the projection device 110 may receive an input image from the host system 111, and the received input image may be converted by the projection device 110 to a reverse-warped image 420 according to the reverse-warped mapping table W. Then, the projection device 110 further projects the reverse-warped image 420 onto the curved projection screen 120. Therefore, the viewer 200 may view a non-warped and undistorted projection image on the projection screen 120 at his position.

The following illustrates how the reverse-warped mapping table W (the second mapping table) is generated.

Figure 2B:
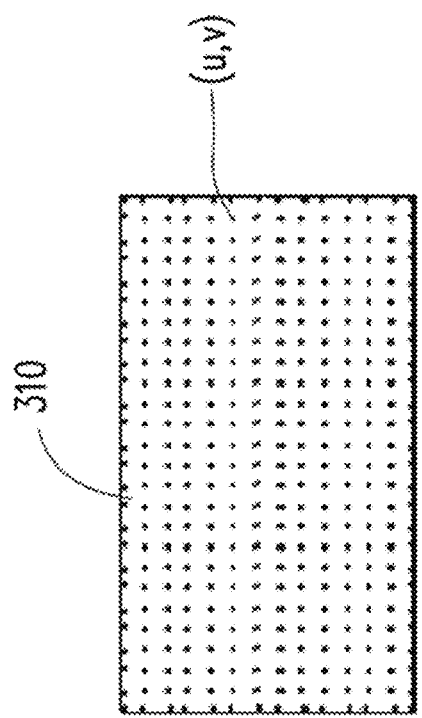
FIG. 2A and FIG. 2B respectively illustrate a first calibration pattern and a brief schematic diagram of the first feature points captured from the first calibration pattern.
Figure 2A:
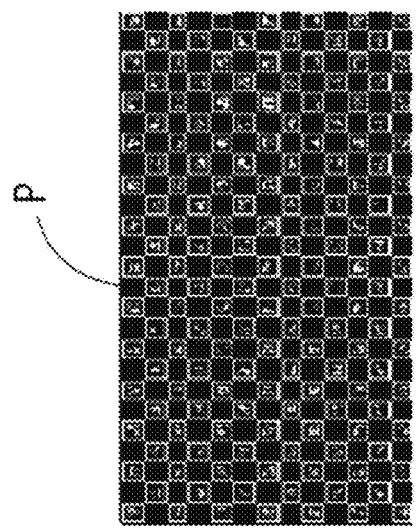
Figure 3A:
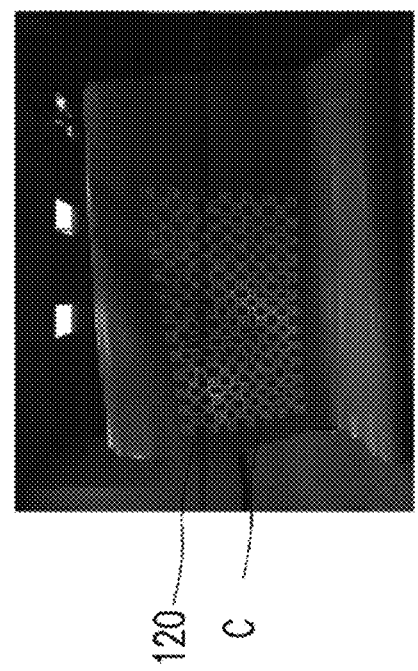
FIG. 3A and FIG. 3B respectively illustrate a second calibration pattern and a brief schematic diagram of a second feature point captured from the second calibration pattern.
Figure 3B:
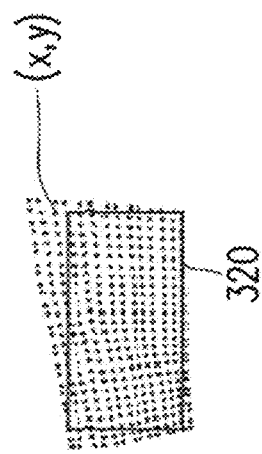

Taking the projection system 100 of the embodiment illustrated in FIG. 1B as an example, FIG. 2A and FIG. 2B respectively illustrate a first calibration pattern and a brief schematic diagram of a first feature point captured from the first calibration pattern. FIG. 3A and FIG. 3B respectively illustrate a second calibration pattern and a brief schematic diagram of a second feature point captured from the second calibration pattern. Please refer to FIG. 1A, FIG. 1B, FIG. 2A to FIG. 3B, in the embodiment, a first calibration pattern P may be received from the outside (for example, from the host system 111), or may be generated inside of the projection device 110 by the projection device 110, where the resolution of the first calibration pattern P is consistent with the resolution of the image to be projected by the projection device 110 (in brief, consistent with the projection resolution of the projection device 110). During the calibration process, the placement of the projection device 110 is not limited to certain positions or rotation angles, as long as the projection direction of the projection device 110 is directed towards the curved projection screen 120. The projection device 110 projects the first calibration pattern P onto the curved projection screen 120. With the sags and crests on the surface of the curved projection screen 120 or the projection angle of the projection device 110, the projected image may be warped or deformed, as illustrated in FIG. 3A. In this embodiment, as illustrated in FIG. 1B, the image capturing device 130 is disposed at the viewer 200 position, so as to capture a second calibration pattern C. The second calibration pattern C is curved. In FIG. 1B, although the position of the image capturing device 130 and the viewer 200 position are shown slightly misplaced, the image capturing device 130 in fact is disposed at the viewer 200 position. It should be noted that, in FIG. 1C, the processor circuit 112 is disposed in the image capturing device 130. The first calibration pattern P may be received from the outside (for example, from the host system 111) or may be generated inside of the image capturing device 130. The resolution of the first calibration pattern P is consistent with the resolution of the image to be projected by the projection device 110. The image capturing device 130 transmits the first calibration pattern P to the projection device 110. The projection device 110 projects the first calibration pattern P onto the curved projection screen 120.

In an embodiment, the processor circuit 112 acquires a plurality of first feature points (u,v) from the first calibration pattern P, and these first feature points are located with respect to a projection coordinate (i.e. the first coordinate). Each of the feature points is different from each other and each of the feature points has a different pattern. A largest circumscribed quadrilateral 310 is acquired by the processor circuit 112 according to the arrangement of the first feature points (u,v). On the other hand, the second calibration pattern C is captured by the processor circuit 112 from the image capturing device 130. The plurality of second feature points (x,y) is acquired from the second calibration pattern C, and these second feature points are located with respect to a coordinate (i.e. second coordinate). A largest inscribed quadrilateral 320 is acquired by the processor circuit 112 according to the arrangement of the second feature points (x,y).

Then, a similar matrix S is generated by the processor circuit 112 according to the largest circumscribed quadrilateral 310 and the largest inscribed quadrilateral 320. A vertical scaling relationship $(S_w, S_h)$ and a horizontal translation relationship $(t_w, t_h)$ are existed between the largest circumscribed quadrilateral 310 and the largest inscribed quadrilateral 320. Four unknowns, $S_w$, $S_h$, $t_w$, and $t_h$ of the similar matrix S may be acquired based on the fourth vertex coordinates of the largest circumscribed quadrilateral 310 and the fourth vertex coordinates the largest inscribed quadrilateral 320. Therefore, the feature points (s,t) of a projection coordinate may be converted from the second feature points (x,y) of a camera coordinate according to the similar matrix S, as shown by the equation below:

$$\begin{bmatrix} s \\ t \\ 1 \end{bmatrix} = \begin{bmatrix} s_w & 0 & t_w \\ 0 & s_h & t_h \\ 0 & 0 & 1 \end{bmatrix} \begin{bmatrix} x \\ y \\ 1 \end{bmatrix}$$

In the equation, the 3×3 matrix is the similar matrix S. The feature points (s,t) represent the warped feature points, and the warp is resulted from a curved projection screen 120 or a projection angle of the projection device 110. The first feature points (u,v) represent calibrated feature points expected by the viewer 200.

In this embodiment, a first mapping table T is converted by the processor circuit 112 to the reverse-warped mapping table W (i.e. the second mapping table) according to the warped feature points (s,t). In this embodiment, the projection device 110 receives the first mapping table T from the host system 111. In other embodiments, as illustrated in FIG. 1C, the image capturing device 130 receives the first mapping table T from the host system 111. In this embodiment, the first mapping table T is a two-dimensional (2D) matrix having the same resolution as the projection resolution of the projection device 110, and each value of the first mapping table T represents a position where each pixel is to be mapped. The first mapping table T is represents coordinate positions corresponding to the arrangement of the original image (i.e. the image provided by the host system 111). In this embodiment, the first mapping table T is acted as a 2D image for the processor circuit 112. The feature points (s,t) are disposed on the first mapping table T, and by an image deformation method, the warped feature points (s,t) are pulled towards the first feature points (u,v), such that a deformation operation on the first mapping table T is performed. Thus, the reverse-warped mapping table W is generated. The reverse-warped mapping table W represents the process of calibrating the warped feature points, and may thus be referred as "reverse-warped" mapping table W. In this embodiment, the image deformation method may be implemented by steps of any image deformation method of the related technical field. However, the invention is not limited thereto. Instructions and suggestions for detailed steps and implementation method thereof may be learned from ordinary knowledge of the related technical field.

Figure 4A:
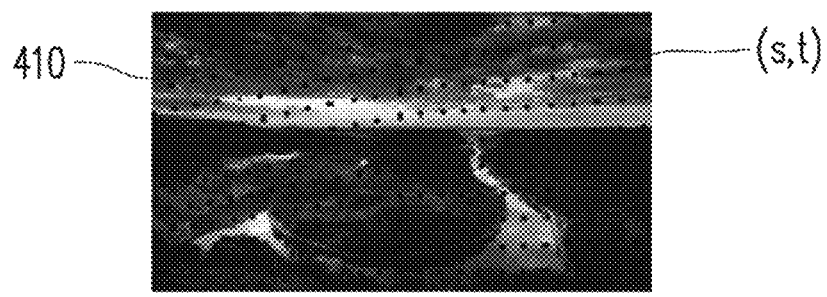
FIG. 4A, FIG. 4B, and FIG. 4C illustrate brief schematic diagrams of a projection device projecting a reverse-warped image to a curved projection screen.
Figure 4B:
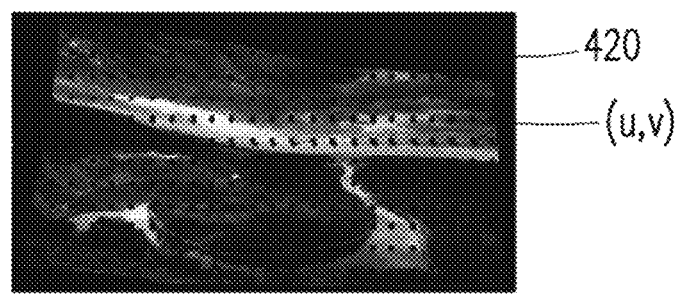
Figure 4C:
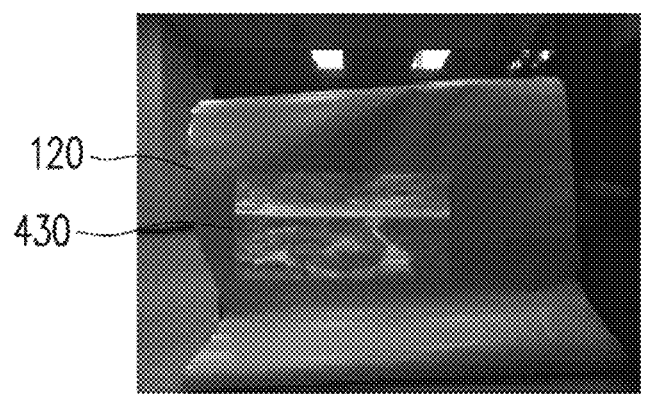

FIG. 4A, FIG. 4B, and FIG. 4C illustrate brief schematic diagrams of a projection device projecting a reverse-warped image to a curved projection screen. Please refer to FIG. 1B and FIG. 4A to FIG. 4C, in this embodiment, the projection device 110 receives the input image 410. After calibration, the warped feature points (s,t) are distributed on the input image 410. It should be noted that the warped feature points (s,t) are not actually shown on the input image 410. The feature points (s,t) illustrated in FIG. 4A are merely for convenience of understanding for people skilled in the art. In this embodiment, the reverse-warped image 420 is generated by the projection device 110 according to the reverse-warped mapping table W. After calibration, the first feature points (u,v) are distributed on the reverse-warped image 420. The first feature points (u,v) represent the calibrated feature points expected by the viewer 200 after calibration. It should be noted that, the first feature points (u,v) are not actually shown on the reverse-warped image 420. The first feature points (u,v) illustrated in FIG. 4B are merely for convenience of understanding for people skilled in the art. The projection device 110 projects the reverse-warped image 420 onto the curved projection screen 120. From the viewer 200's angle, a non-warped and undistorted projection result (that is, a calibrated image 430) is viewed.

Therefore, in this embodiment, the projection device 110 projects the first calibration pattern P onto the curved projection screen 120. The image capturing device 130 captures the image of the first calibration pattern P projected onto the curved projection screen 120, so as to acquire the second calibration pattern C. A plurality of warped feature points (s,t) are generated by the process circuit 112 according to the first calibration pattern P and the second calibration pattern C. The reverse-warped mapping table W (the second mapping table) is converted from the first mapping table T by the processor circuit 112 according to the plurality of warped feature points (s,t). The reverse-warped image 420 is generated by processor circuit 112 of the projection device 110 according to the input image 410 and the reverse-warped mapping table W (the second mapping table), and the projection device 110 projects the reverse-warped image 420 onto the curved projection screen 120. The viewer 200 views a non-warped and undistorted calibrated image 430.

In this embodiment, the processor circuit 112 includes, for example, a central processing unit (CPU), a microprocessor, a digital signal processor (DSP), a programmable controller, a programmable logic device (PLD), other similar devices, or the combination of the devices. However, the invention is not limited thereto. In this embodiment, the image capturing device 130 includes, for example, a camera, a cellphone camera, a general camera, or other similar devices. However, the invention is not limited thereto. In this embodiment, the storage may be, for example, a moveable random access memory (RAM), a read-only memory (ROM), flash memory), or similar elements or the combination of the aforementioned elements. The host system 111 is an electronic device, for example, a personal computer, a tablet, or a smartphone, which may act as image sources for providing images.

Figure 5:
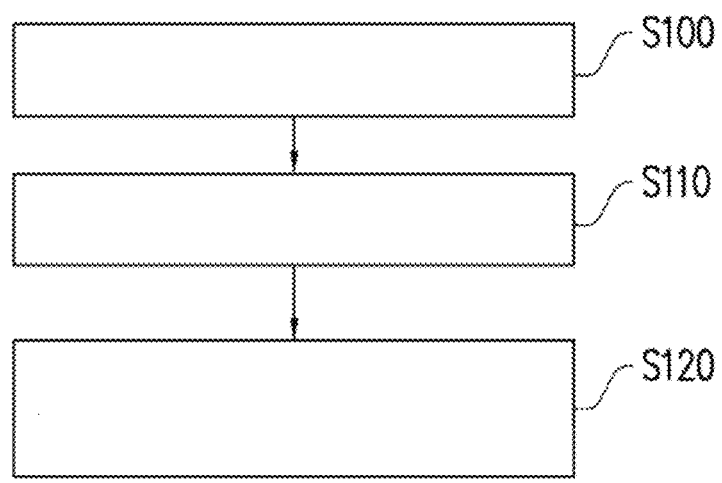
FIG. 5 illustrates a brief schematic diagram of an image calibration method according to an embodiment of the invention.

FIG. 5 illustrates a brief schematic diagram of an image calibration method according to an embodiment of the invention. Please refer to FIG. 1A to FIG. 1C, and FIG. 5, the image calibration method of FIG. 5 is adapted to be performed by, for example, the projection systems 100 of FIG. 1A to FIG. 1C. The projection device 110 projects the reverse-warped image onto the curved projection screen 120. In a step S100, the plurality of warped feature points (s, t) are generated by the processor circuit 112 according to the first calibration pattern P and the second calibration pattern C. In a step S110, the second mapping table W is converted from converts the first mapping table T by the processor circuit 112 according to the warped feature points (s, t). In a step S120, the reverse-warped image is generated by the processor circuit 112 according to the input image and the second mapping table W, and the reverse-warped image is projected onto the curved projection screen 120. Therefore, the viewer 200 views a non-warped and undistorted calibration image. Moreover, instructions and recommendations for the image calibration method of the embodiment may be learned from descriptions of the embodiments of FIG. 1A to FIG. 4C.

In summary, the embodiments of the invention have at least one of following advantages or effects. In the embodiments of the invention, in addition to the projection device, the projection system includes an image capturing device, so as to capture a calibrated image projected by the projection device. After performing the image calibration method, a pre-wrap image is generated. The geometry calibration process is relatively simple and fast. The image capturing device may be disposed at the viewer position, and the image capturing device may be moved away after completing the image capturing. After the calibration is completed, the reverse-warped mapping table is generated for the projection device. The reverse-warped mapping table represents a geometry calibration for a projection device used with a curved projection screen. The reverse-warped image is generated by the projection device according to the reverse-warped mapping table, and the reverse-warped image is projected onto the curved projection screen. The image viewed at the viewer position is a non-warped and undistorted calibrated result.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
a processor circuit, generating a reverse-warped image according to an input image and a second mapping table,
wherein the projection device is adapted to project the reverse-warped image onto a projection screen, and
wherein the second mapping table is converted from a first mapping table by the processor circuit according to a plurality of warped feature points caused according to a first calibration pattern and a second calibration pattern,
wherein the first calibration pattern comprises a plurality of first feature points, the second calibration pattern comprises a plurality of second feature points, a similar matrix is generated by the processor circuit according to the plurality of first feature points and the plurality of second feature points, and the plurality of second feature points are converted to the plurality of warped feature points by the processor circuit to according to the similar matrix,
wherein a largest circumscribed quadrilateral is acquired by the processor circuit according to an arrangement of the plurality of first feature points, a largest inscribed quadrilateral is acquired by the processor circuit according to an arrangement of the plurality of second feature points, and the similar matrix is generated by the processor circuit according to the largest circumscribed quadrilateral and the largest inscribed quadrilateral.

2. The projection device of claim 1, further comprising an image capturing device, wherein the projection device projects the first calibration pattern onto the projection screen, and the image capturing device captures an image of the first calibration pattern projected onto the projection screen, so as to acquire the second calibration pattern, and wherein the image capturing device is disposed at a viewer position in front of the projection screen.

3. The projection device of claim 1, wherein the plurality of first feature points and the plurality of warped feature points are located with respect to a first coordinate, and the plurality of second feature points are located with respect to a second coordinate.

4. An image calibration method, adapted to be performed by a projection device, and adapted to project a reverse-warped image to a projection screen, wherein the image calibration method comprising:
generating a plurality of warped feature points according to a first calibration pattern and a second calibration pattern;
converting a first mapping table to a second mapping table according to the plurality of warped feature points, wherein the first calibration pattern is projected onto the projection screen, and the second calibration pattern is acquired by capturing an image of the first calibration pattern projected onto the projection screen; and
generating the reverse-warped image according to an input image and the second mapping table; and
projecting the reverse-warped image onto the projection screen,
wherein the first calibration pattern comprises a plurality of first feature points, the second calibration pattern comprises a plurality of second feature points, and wherein the step of generating the plurality of warped feature points according to the first calibration pattern and the second calibration pattern comprises:

generating a similar matrix according to the plurality of first feature points and the plurality of second feature points; and converting the plurality of second feature points to the plurality of warped feature points according to the similar matrix, wherein the step of generating the similar matrix according to the plurality of first feature points and the plurality of second feature points comprises:

acquiring a largest circumscribed quadrilateral according to an arrangement of the plurality of first feature points;

acquiring a largest inscribed quadrilateral according to an arrangement of the plurality of second feature points; and generating the similar matrix according to the largest circumscribed quadrilateral and the largest inscribed quadrilateral.

5. The image calibration method of claim 4, further comprising:

disposing an image capturing device at a viewer position in front of the projection screen, so as to capture the image of the first calibration pattern projected onto the projection screen.

6. The image calibration method of claim 4, wherein the plurality of first feature points and the plurality of warped feature points are located with respect to a first coordinate, and the plurality of second feature points are located with respect to a second coordinate.

7. A projection system, adapted to project an image to a projection screen, and the projection system comprising:

a projection device, projecting a first calibration pattern onto the projection screen;

an image capturing device, capturing an image of a first calibration pattern projected onto the projection screen, so as to acquire a second calibration pattern; and a processor circuit, connected with the projection device and the image capturing device, wherein a plurality of warped feature points is generated by the processor circuit according to the first calibration pattern and the second calibration pattern, and a second mapping table is converted from a first mapping table by the processor circuit according to the plurality of warped feature points, and wherein a reverse-warped image is generated by the projection device according to an input image and the second mapping table, and the reverse-warped image is projected onto the projection screen by the projection device, wherein the first calibration pattern comprises a plurality of first feature points, the second calibration pattern comprises a plurality of second feature points, a similar matrix is generated by the processor circuit according to the plurality of first feature points and the plurality of second feature points, and the plurality of second feature points is converted by the processor circuit to the plurality of warped feature points according to the similar matrix, wherein a largest circumscribed quadrilateral is acquired by the processor circuit according to an arrangement of the plurality of first feature points, and a largest inscribed quadrilateral is acquired by the processor circuit according to an arrangement of the plurality of second feature points, and wherein the similar matrix is generated by the processor circuit according to the largest circumscribed quadrilateral and the largest inscribed quadrilateral.

8. The projection system of claim 7, wherein the image capturing device is disposed at a viewer position in front of the projection screen.

9. The projection system of claim 7, wherein the plurality of first feature points and the plurality of warped feature points are located with respect to a first coordinate, and the plurality of second feature points are located with respect to a second coordinate.

* * * * *